No. 760,980. PATENTED MAY 24, 1904.
J. S. GILES.
PRESERVING JAR.
APPLICATION FILED FEB. 15, 1904.
NO MODEL.
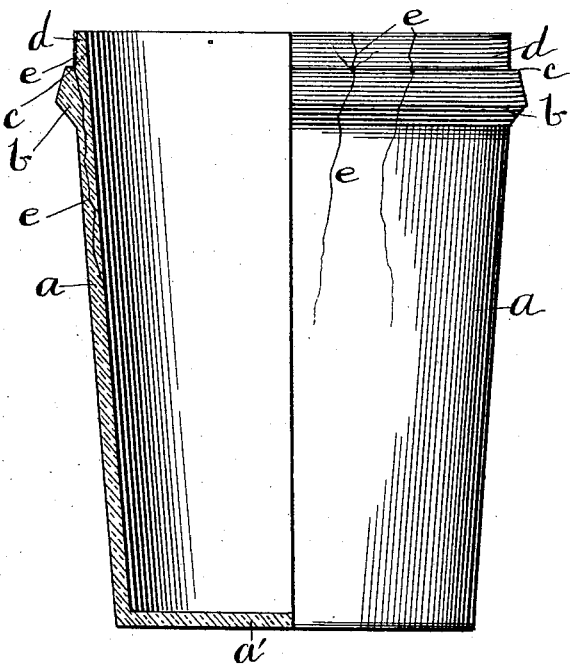
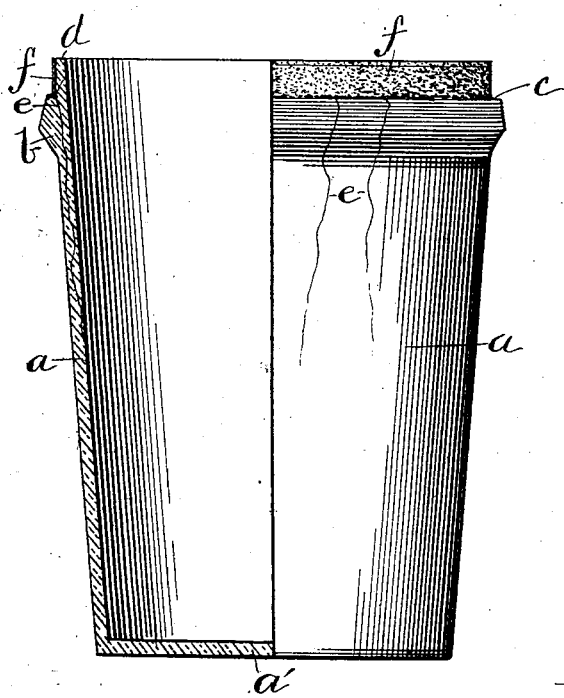
Witnesses
Pierson H. Banning.
Walker Banning.
Inventor.
John S. Giles.
By Banning & Banning
Attys No. 760,980.                                                              Patented May 24, 1904.

UNITED STATES PATENT OFFICE.

JOHN S. GILES, OF UPLAND, INDIANA.

PRESERVING-JAR.

SPECIFICATION forming part of Letters Patent No. 760,980, dated May 24, 1904.

Application filed February 15, 1904. Serial No. 193,679. (No model.)

*To all whom it may concern:*

Be it known that I, JOHN S. GILES, a citizen of the United States, residing at Upland, in the county of Grant and State of Indiana, have invented a certain new and useful Improvement in Preserving-Jars, of which the following is a specification.

This invention relates more particularly to glass jars used in connection with a vacuum process and hermetic sealing for preserving fruits, vegetables, meats, and other articles, but is adapted for use and can be used with other methods of canning or preserving where a vacuum and hermetically-sealed cover are employed.

In the process of manufacturing glass jars when the method of pressing alone is employed a common defect is caused by air becoming confined between the glass and the mold, and, finally, under the force applied to distribute the glass into shape of the piece desired and superheated by the hot glass it forces a channel or way through the glass upward to a vent or opening, and frequently it does not spend its force or cease to open a channel or way in the surface of the glass till it reaches the top of the jar or piece. This channel is frequently so slight as to escape the most careful inspection and is wholly immaterial in any common unfinished pressed glassware; but in pressed ware for vacuum canning where an accurate hermetic seal is required and where the gasket is of rubber or such like material it is found that these materials are not sufficiently pliable to fully meet the unevenness of surface caused by these minute channels and that the seal of such jars is finally overcome by a slow leakage of air, and as the atmospheric pressure alone is depended upon to hold the cover of the jar in place after the sealing is effected these slow leaks, overcoming the vacuum in the jar, release the cover, and the product packed in the jar is spoiled and lost. The method of obliterating these little channels as heretofore practiced is to reheat the piece or jar to a degree so it will run on the surface and fill up the channels and even the surface, a process called "warming in" in glass manufacturing; but this adds largely to the cost of the ware and is a finish not necessary or required in jars of this class, except to get a level even surface at the sealing-seat. This defect is so common that to resort to sorting out the pieces so affected would cause such a loss of product as to make the ware equally if not more costly; besides, the defect in many cases is so obscure that they would not be discovered till the goods packed in them had spoiled or the cover comes off.

The object of the present invention is at slight cost to insure a uniform and level seating-face for the gasket or other sealing means without the necessity of reducing the seating-face to present a perfectly level surface by warming in or incurring the loss by sorting out the defect, to furnish a seating-face for the gasket or other sealing means which will effectually prevent leakage after the jar has been capped or covered, and to construct a jar as a new article of manufacture having a perfect seating-face to coact with a gasket or other sealing means by applying to the seating-face of the jar a thin coating having the qualities of leveling the seating-face and capable of sealing the jar without becoming broken or disrupted at a slight cost.

The invention consists in the construction of jar and application thereto of a leveling material in the form of a film or coat on the seating-face, as hereinafter described and claimed.

In the drawings, Figure 1 is an elevation of a jar, one side being in section and the other in full elevation, showing on the seating-face of the ledge defects in the form of small channels; and Fig. 2, a similar view to Fig. 1, showing the same jar with the seating-face of the ledge made level or in a uniform plane at all points by the application of a film or coating.

The jar shown is of that type which is pressed into shape by means of a plunger. The jar has a body $a$ with a closed bottom $a'$. The exterior of the jar adjacent to its top has a projecting annular flange $b$, with a seating-face $c$ for the gasket or other sealing means, (not shown,) and extending above the flange is a rim $d$ for the cover, as usual, the cover and the sealing-gasket not being shown. The seating-face $c$ of the flange $b$ is shown in Fig.

1 with two small channels $e$, which channels extend below the seating-face and furnish the cause for a leakage by reason of the gasket or other sealing means not fully contacting the seating-face adjacent to and in the channels. The channels $e$ on the seating-face $c$ are made inoperative as a cause for leakage by applying to the seating-face a film or coating $f$ of a fluid nature when applied, so as to readily adhere to the seating-face. The film or coating $f$ can be applied by dipping the end of the jar into a receptacle containing the film or coating in a fluid condition, in which case the film or coating will adhere not only to the seating-face $c$, but also to the exterior face of the rim $d$, which, however, does not destroy the utility of the film or coating in leveling the seating-face and destroying the effects of the channels in causing a leakage. The film or coating can be a preparation of silicate of soda or can be made of any suitable gum—such, for instance, as a preparation of gum-arabic—or of glue or other material of a similar nature that will be fluid in its nature for dipping thereinto the end of the jar or otherwise applying the film or coating around the seating-face, and it is preferred that the gum used should be of a nature as not to become brittle and easily broken after it has been applied to the jar, but will retain its unity when the gasket or other sealing means and the cap or cover is applied to the jar. The film or coating is preferably applied thin and of a thickness to make the seating-face at all points level and uniform, thus preventing the depression of the channel or channels below the remainder of the seating-face, making, in fact, a seating-face possessing all the advantages of a warmed-in seating-face without the necessity of reheating to reduce the channels. It will be seen also that this film or coating will act equally as well in the case of a depression as in the case of a channel, making the seating-face level and uniform, so that when the gasket or sealing means is applied and the cover pressed or otherwise brought to place the seating-face and the gasket or sealing means will contact entirely around the jar, making a tight close seal, which will be proof against leakage. The nature of the material used should be one that will not become chipped off or flake off in handling the jars, but will maintain its integrity in the ordinary handling of jars for shipment and for use, and at the same time the film or coating must have a sufficient depth to destroy the channels or depressions on the seating-face and yet not be readily broken away. The nature of the material for the film or coating must be one that will firmly adhere to the surface to which it is applied and which will readily flow or seek a position to destroy the channels or depressions without impairing the condition of the seating-face as regards receiving the gasket or other sealing means for sealing purposes.

A jar treated around the seating-face for the gasket or other sealing means with a film or coating of adhering wax enables preserving-jars to be shipped for use without fear that the contents of the jar will be injured by fermentation or otherwise rendered unfit for use by reason of a leakage at the seal, and by means of this film or coating preserving-jars are made positively tight at the point of sealing without the necessity of any grinding or fitting of the seating-face for the gasket or other sealing means.

What I claim as new, and desire to secure by Letters Patent, is—

1. A preserving-jar having at its upper end a seating-face for a gasket or other sealing means, said seating-face having thereon a film or coating serving to effect a uniform seating for the gasket or other sealing means, substantially as described.

2. A preserving-jar having at its upper end an annular ledge furnishing a seating-face for a gasket or other sealing means and having on the upper face of the ledge a film or coating serving to effect a perfect seating for the gasket or other sealing means, substantially as described.

JOHN S. GILES.

Witnesses:
 CARL C. GILES,
 O. B. PEELLE.